(12) United States Patent
Hashimoto et al.

(10) Patent No.: US 8,920,949 B2
(45) Date of Patent: Dec. 30, 2014

(54) BATTERY UNIT

(75) Inventors: Masatoshi Hashimoto, Ibaraki (JP); Keiichi Tanii, Ibaraki (JP); Kyohei Takeuchi, Ibaraki (JP)

(73) Assignee: Hitachi Maxell, Ltd., Ibaraki-shi (JP)

( * ) Notice: Subject to any disclaimer, the term of this patent is extended or adjusted under 35 U.S.C. 154(b) by 0 days.

(21) Appl. No.: 14/113,701

(22) PCT Filed: Jan. 6, 2012

(86) PCT No.: PCT/JP2012/050208
§ 371 (c)(1),
(2), (4) Date: Oct. 24, 2013

(87) PCT Pub. No.: WO2012/147375
PCT Pub. Date: Nov. 1, 2012

(65) Prior Publication Data
US 2014/0050948 A1    Feb. 20, 2014

(30) Foreign Application Priority Data
Apr. 27, 2011   (JP) ................. 2011-099660

(51) Int. Cl.
| | |
|---|---|
| *H01M 2/30* | (2006.01) |
| *H01M 2/10* | (2006.01) |
| *H01M 10/42* | (2006.01) |
| *H01M 2/20* | (2006.01) |
| *H01M 10/0525* | (2010.01) |

(52) U.S. Cl.
CPC .............. *H01M 2/30* (2013.01); *H01M 2/1038* (2013.01); *H01M 10/4257* (2013.01); *H01M 10/0525* (2013.01); *H01M 2/20* (2013.01); *Y02T 10/7011* (2013.01)
USPC .............................................. 429/7; 429/176

(58) Field of Classification Search
USPC ................... 429/7, 176, 61, 177, 178
See application file for complete search history.

(56) References Cited

U.S. PATENT DOCUMENTS

| | | | |
|---|---|---|---|
| 5,993,248 A | 11/1999 | Bethurum | |
| 6,368,744 B1 * | 4/2002 | Hatazawa et al. | 429/163 |

(Continued)

FOREIGN PATENT DOCUMENTS

| | | |
|---|---|---|
| CN | 101010815 A | 8/2007 |
| EP | 2 680 338 A1 | 1/2014 |

(Continued)

OTHER PUBLICATIONS

International Search Report dated Mar. 6, 2012, corresponding application No. PCT/JP2012/050208.

(Continued)

*Primary Examiner* — Mark F. Huff
*Assistant Examiner* — Monique Wills
(74) *Attorney, Agent, or Firm* — Westerman, Hattori, Daniels & Adrian, LLP

(57) ABSTRACT

The battery unit (1) includes a flat battery (2) having a positive electrode can (10) and a negative electrode can (20) and a circuit substrate (61) provided on one of an upper surface and a bottom surface of the flat battery (2). Circuit components (62) are mounted at the circuit substrate (61). A battery side negative electrode terminal (81) and a battery side positive electrode terminal (82) electrically connected to the flat battery (2) are provided on a surface of the flat battery (2) provided with the circuit substrate (61). Substrate side terminals (63) electrically connected to the battery side negative electrode terminal (81) and the battery side positive electrode terminal (82) are formed at a side surface of the circuit substrate (2).

11 Claims, 9 Drawing Sheets

(56) References Cited

U.S. PATENT DOCUMENTS

| | | |
|---|---|---|
| 2004/0038585 A1 | 2/2004 | Sugimoto et al. |
| 2007/0207380 A1* | 9/2007 | Tononishi .................... 429/176 |
| 2008/0102368 A1 | 5/2008 | Sumida et al. |
| 2009/0136843 A1 | 5/2009 | Yamamoto et al. |
| 2013/0323538 A1 | 12/2013 | Tanii et al. |

FOREIGN PATENT DOCUMENTS

| | | |
|---|---|---|
| JP | 51-114622 U | 9/1976 |
| JP | 02-057236 U | 4/1990 |
| JP | 11-233088 A | 8/1999 |
| JP | 2003-272587 A | 9/2003 |
| JP | 2004-87191 A | 3/2004 |
| JP | 2004-247256 A | 9/2004 |
| JP | 2006-210167 A | 8/2006 |
| JP | 2009-152183 A | 7/2009 |
| JP | 2010-205700 A | 9/2010 |

OTHER PUBLICATIONS

Chinese Official communication issued on May 9, 2014, corresponding Chinese Patent Application No. 201280020400.8, with English Translation.

Extended European Search Report dated Sep. 16, 2014 issued in corresponding European Application No. 12776977.6; (5 pages).

* cited by examiner

BATTERY UNIT

TECHNICAL FIELD

The present invention relates to a battery unit provided with a flat battery and a substrate.

BACKGROUND ART

There has been a known conventional structure including a battery, a protection circuit, and the like formed as a unit. For example, a structure including a battery case, a protection circuit, and the like on the battery case as disclosed by JP 2009-152183 A is known as such a structure.

DISCLOSURE OF THE INVENTION

The structure disclosed by JP 2009-152183 A described above has a relatively large size battery and therefore the total size of the battery pack is not much affected by a relatively large connection arrangement between the battery and the protection circuit.

In contrast, a device provided with a flat battery generally has a small size, and therefore if a substantially circular flat battery is used to form a substantially circular column shaped battery unit, the battery unit must also be compact. As for such a battery unit, a substrate having a protection circuit and the like formed thereon is provided, the size is increased and a connection arrangement between the flat battery and the substrate may change the total size of the battery unit.

Therefore, it is an object of the present invention to provide a battery unit having a flat battery and a substrate that includes a devised connection arrangement between the flat battery and the substrate, so that the battery unit can be reduced in size.

A battery unit according to one embodiment of the present invention includes a flat battery having a tubular exterior can with a bottom and a tubular sealing can with a bottom that covers an opening of the exterior can, in which the exterior can and the sealing can are assembled so that a portion of a side wall of the exterior can that is adjacent the opening is positioned on an outer circumference of a side wall of the sealing can and a substrate provided on a flat surface of the exterior can or a flat surface of the sealing can, the substrate is mounted with a circuit component, of the flat surfaces of the exterior can and the sealing can, the flat surface provided with the substrate thereon is provided with a battery side terminal electrically connected to the flat battery, the substrate has a substrate side terminal electrically connected to the battery side terminal formed at a side surface thereof (a first feature).

In this structure, the flat battery and the substrate are electrically connected by the substrate side terminal formed at the side surface of the substrate and the battery side terminal provided at the flat battery. Therefore, the flat battery and the substrate can easily be connected by soldering or the like while they are assembled. Furthermore, in the above-described structure, the battery unit can have a reduced thickness as compared to the case of connecting them by soldering while the terminals are penetrated through the substrate. More specifically, if soldering is carried out while the terminals are penetrated through the substrate, the thickness of the unit as a whole increases because of the terminals projecting and the solder from the substrate. In contrast, when the battery side terminal and the substrate side terminal are electrically connected at the side surface of the substrate as described above, the presence of the terminals and the solder does not affect the thickness of the battery unit, and therefore the battery unit can have a reduced thickness. In addition, the terminals no longer project with respect to the substrate and therefore short-circuiting caused by the terminal projection parts can be prevented.

In the first feature, the circuit component is mounted at a surface of the substrate on the flat battery side (a second feature). In this way, the circuit substrate mounted with the circuit component can be provided to the flat battery in a compact manner. Furthermore, in the above-described structure, the circuit component is not exposed to the outside of the battery unit, so that a user or anyone can be prevented from touching the circuit component.

In the first or second feature, the substrate is provided with a notch at an outer circumferential edge thereof, and the substrate side terminal is formed on a side surface of the substrate in the notch (a third feature).

In this way, the substrate side terminal is formed in the notch provided at the outer circumferential edge of the substrate and therefore the battery side terminal electrically connected to the substrate side terminal can be restrained from projecting outwardly from the substrate in a plan view. More specifically, in the above-described structure, the battery side terminal electrically connected to the substrate terminal can be provided in the notch provided at the outer circumferential edge of the substrate, so that the battery side terminal can be restrained from projecting greatly in the outward direction beyond the outer circumferential edge of the substrate.

Therefore, in the above-described structure, the battery unit can be even more compact.

In the third feature, the notch is formed to have a shape that forms at least a part of a circle when viewed in a thickness-wise direction of the substrate (a fourth feature). In this way, the notch can be formed easily by hole drilling and solder can be distributed efficiently over the entire substrate side terminal when the substrate side terminal formed at the substrate side surface of the notch and the battery side terminal provided at the flat battery are soldered. In this way, the substrate side terminal and the battery side terminal can be connected more securely.

In the third feature, the battery side terminal is connected to a surface of the substrate on the side of the flat battery (a fifth feature). In this way, the substrate can be held by the battery side terminal from the flat battery side.

In the fifth feature, the substrate is provided so that the notch is positioned on the battery side terminal, and a tip end of the battery side terminal projects inwardly in the notch so as to connect outer circumferential edges of the substrate in the notch (a sixth feature).

In this way, the battery side terminal can be exposed as largely as possible to the notch of the substrate. Therefore, the substrate side terminal provided at the notch of the substrate and the battery side terminal can be soldered readily and more securely.

In any one of the first to sixth features, the substrate has a shape and a size equal to an outer shape of the flat battery while the substrate is provided on the flat battery (a seventh feature). In this way, the battery unit can be compact.

In any one of the first to seventh features, a plurality of the battery side terminals are provided on the flat surface provided with the substrate thereon in the flat battery, and at least one of the plurality of battery side terminals is electrically connected to the substrate in at least two points (an eighth feature).

In this way, the substrate can be connected to the flat battery in a stable state. More specifically, in the above-described structure, the battery side terminal provided at the flat battery is electrically connected to the substrate in at least three points. Therefore, in the above-described structure, the battery side terminal can be connected to the substrate in a stable state as compared to the case of electrically connecting the battery side terminal to the substrate in one or two points. Therefore, by the above-described structure, the substrate can be prevented from being skewed and contacting the battery to cause short-circuiting.

In the eighth feature, the battery side terminal electrically connected to the substrate in at least two points has a battery connection portion connected to the flat battery and at least two substrate connection portions electrically connected to the substrate, the substrate connection portions are provided to have the battery connection portion placed therebetween, and the battery connection portion projects toward the flat battery and is located closer to the flat battery than the substrate connection portions are, so that a space in which the circuit component can be provided is formed between the battery connection portion and the substrate (a ninth feature).

In this way, the battery connection portion of the battery side terminal electrically connected to the substrate in at least two points has a space in which the circuit components can be provided. In this way, a larger number of circuit components can be mounted to the substrate.

Furthermore, the battery side terminal is connected to the substrate by the substrate connection portions provided to hold the battery side connection portion connected to the flat battery therebetween. Therefore, the substrate can be held in a stable state with respect to the flat battery by the battery side terminal.

In the battery unit according to the embodiment of the present invention, the substrate side terminal is formed at the side surface of the substrate, so that the connecting part between the substrate and the flat battery can be compact in their thickness-wise direction. In this way, the battery unit can be reduced in size.

MODE FOR CARRYING OUT THE INVENTION

Figure 1:
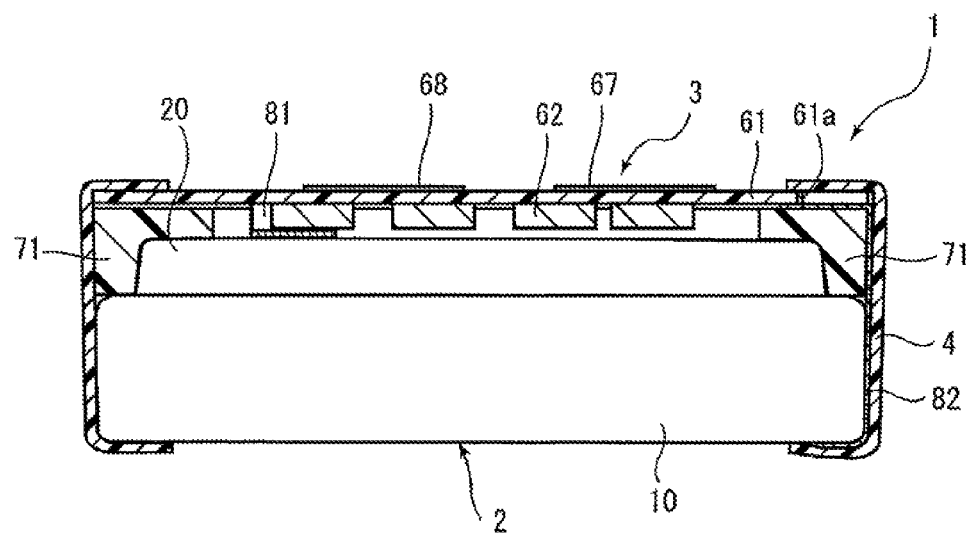
FIG. 1 is a sectional view of components other than a flat battery in a battery unit according to a first embodiment of the invention.

Hereinafter, embodiments of the present invention will be described in detail in conjunction with the accompanying drawing in which the same or corresponding portions are designated by the same reference characters, and their description will not be repeated.

First Embodiment

Overall Structure

FIG. 1 is a view of a general structure of a battery unit 1 according to an embodiment of the present invention. The battery unit 1 includes an integral arrangement of a coin shaped flat battery 2 and a circuit portion 3. The battery unit 1 is for example used as a power source for a small size device that uses a coin type battery such as a pedometer, a hearing aid, an electronic key for automobile, an IC tag, and a sensor unit. Note that the battery unit 1 is a secondary battery unit that allows the flat battery 2 to be charged.

More specifically, as shown in FIG. 1, in the battery unit 1, the circuit portion 3 is adhesively fixed for example with an elastic adhesive on the flat battery 2. The circuit portion 3 has a shape and a size equal to those of the outer shape of the flat battery 2 as viewed in a direction in which the flat battery 2 and the circuit portion 3 are placed on each other. In this way, the flat battery 2 and the circuit portion 3 can be arranged in a compact manner in the thickness-wise direction while the battery unit 1 can have a size equal to that of the outer shape of the flat battery 2 as viewed in the direction in which the flat battery 2 and the circuit portion 3 are placed on each other. Note that the use of the elastic adhesive for adhering the flat battery 2 and the circuit portion 3 further ensures that even members having different thermal deformation amounts can be adhered with each other by the adhesive.

Figure 2:
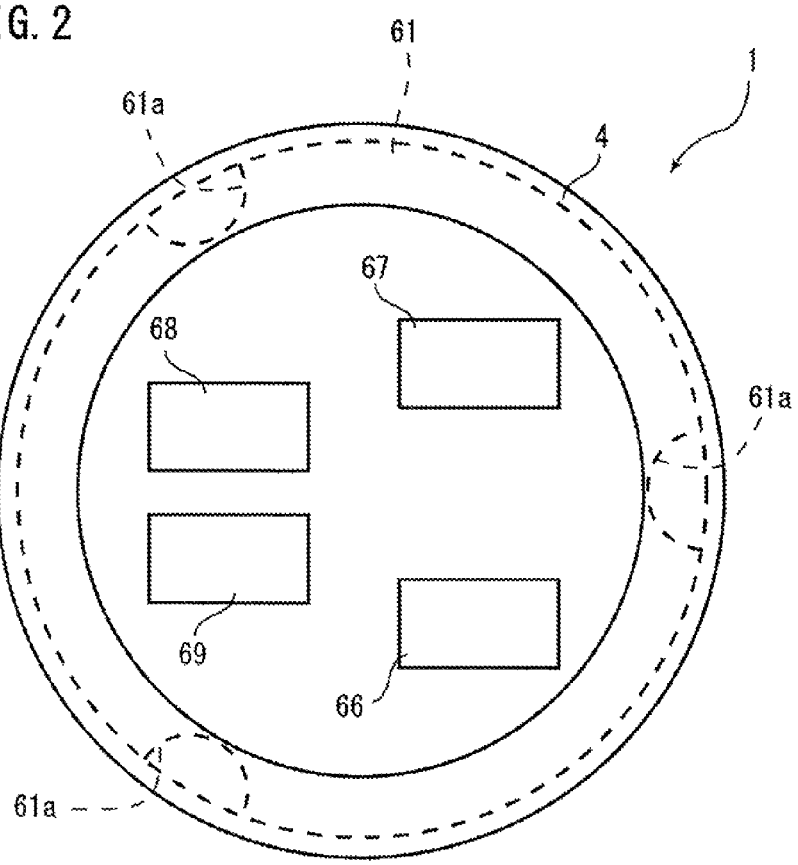
FIG. 2 is a top view of the battery unit.

As will be described in detail, various terminals 66 to 69 (that will be described) are formed on a surface of a circuit substrate 61 of the circuit portion 3 on the opposite side to the flat battery 2 (for example see FIG. 2). In this way, in the battery unit 1, while the flat battery 2 and the circuit portion 3 are assembled as shown in FIG. 1, only the terminals 66 to 69 are exposed as shown in FIG. 2.

Furthermore, as shown in FIG. 1, a side surface of the layered body including the flat battery 2 and the circuit portion 3 fixed as they are layered on each other is covered with a tube 4 of a thermally shrinkable resin material such as PET (polyethylene terephthalate). The tube 4 covers not only the side surface of the layered body but also outer circumferential sides of both end surfaces of the layered body (an outer circumferential side of the circuit substrate 61 of the circuit portion 3 and an outer circumferential side of the bottom of the exterior can 10 of the flat battery 2). In this way, said layered body may have improved strength and the side surface of the layered body may have improved appearance. A step as thick as the tube 4 forms at an end surface of the layered body, so that the terminals 66 to 69 formed at the outer surface of the circuit portion 3 positioned at the end surface of the layered body are provided on the inner side in the direction in which the elements are layered on one another than the tube 4. Therefore, the terminals 66 to 69 are less prone to damage.

In the following, referring to FIGS. 1 to 4, the flat battery 2 and the circuit portion 3 will be described in detail.

Figure 3:
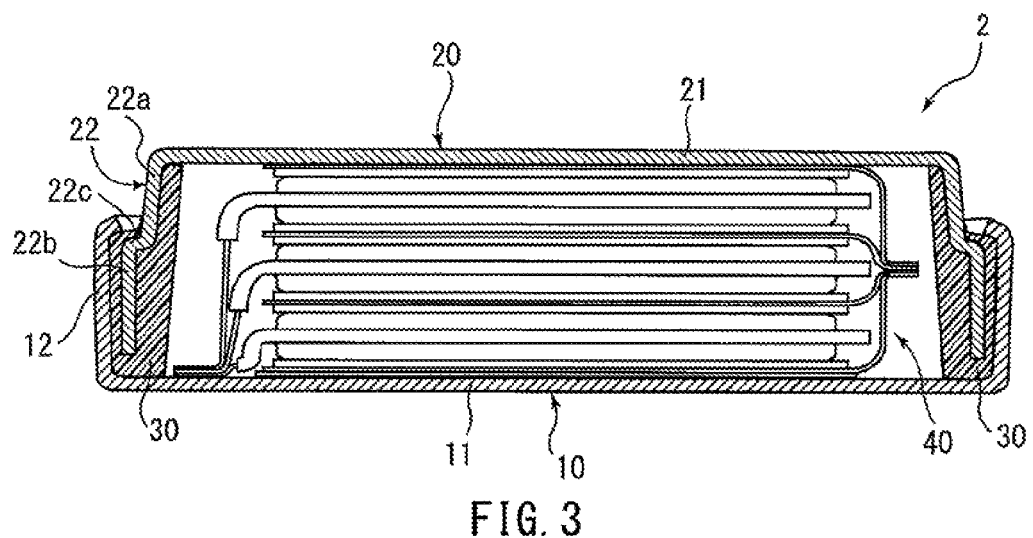
FIG. 3 is a sectional view of components other than an electrode member in the flat battery.

As shown in FIG. 3, the flat battery 2 includes a positive electrode can 10 as a cylindrical exterior can with a bottom, a negative electrode can 20 as a sealing can that covers the opening of the positive electrode can 10, a gasket 30 provided between the outer circumferential side of the positive electrode can 10 and the outer circumferential side of the negative electrode can 20, and an electrode member 40 stored in a space formed between the positive electrode can 10 and the negative electrode can 20. Therefore, the flat battery 2 is formed to have a flat coin shape as a whole as the positive electrode can 10 and the negative electrode can 20 are joined. A non-aqueous electrolyte (not shown) is also enclosed in the space formed between the positive electrode can 10 and the negative electrode can 20 in addition to the electrode member 40. Note that according to the embodiment, the flat battery 2 is formed as a lithium ion battery.

The positive electrode can 10 is made of a metal material such as stainless steel and formed to have a cylindrical shape with a bottom for example by press-molding. The positive electrode can 10 includes a circular bottom 11 and a cylindrical circumferential wall 12 formed continuously with the bottom 11 at its outer circumference. The circumferential wall 12 is provided to extend substantially perpendicularly from the outer circumferential end of the bottom 11 when viewed in a longitudinal section (in a state shown in FIG. 3). As will be described, while the gasket 30 is held between the positive electrode can 10 and the negative electrode can 20, the opening end side of the circumferential wall 12 is bent inwardly and caulked to the negative electrode can 20. In this way, the bottom 11 of the positive electrode can 10 forms the bottom of the flat battery 2.

The negative electrode can 20 is made of a metal material such as stainless steel and formed to have a cylindrical shape with a bottom by press-molding similarly to the positive electrode can 10. The negative electrode can 20 has a cylindrical circumferential wall 22 whose outer size is smaller than that of the circumferential wall 12 of the positive electrode can 10 and a circular flat surface 21 that blocks one opening of the cylindrical circumferential wall 22. Therefore, the flat surface 21 of the negative electrode can 20 forms the upper surface of the flat battery 2.

The circumferential wall 22 of the negative electrode can 20 is provided to extend substantially perpendicularly with respect to the flat surface 21 when viewed in a longitudinal section similarly to the positive electrode can 10. The circumferential wall 22 has a large diameter part 22b whose diameter increases stepwise as compared to a base end 22a on the side of the flat surface 21. More specifically, the circumferential wall 22 has a stepped part 22c formed between the base end 22a and the large diameter part 22b. As shown in FIG. 3, the opening end side of the circumferential wall 12 of the positive electrode can 10 is bent and caulked to the stepped part 22c. More specifically, the circumferential wall 12 of the positive electrode can 10 has its opening end side fitted to the stepped part 22c of the negative electrode can 20.

Structure of Circuit Portion

As shown in FIG. 1, the circuit portion 3 includes a circuit substrate 61 (substrate) and a plurality of circuit components 62 mounted on the circuit substrate 61. The plurality of circuit components 62 are mounted together on one surface side of the circuit substrate 61. Examples of the circuit components 62 include a protection IC that forms a protection circuit, a charging IC that forms a charging circuit, and a DC/DC converter that carries out voltage conversion. Using the DC/DC converter provided in the battery unit 1, voltage to be output from the battery unit 1 can conform to the rated voltage of an electrical device to be used even if the rated voltage of the flat battery 2 is different from the rated voltage of the electrical device. Therefore, the battery unit 1 can be formed using flat batteries with various kinds of rated voltage. Although not detailed, the circuit portion 3 is adapted to change the output voltage when the remaining capacity of the flat battery 2 is reduced in order to detect the remaining capacity of the flat battery 2.

Figure 4:
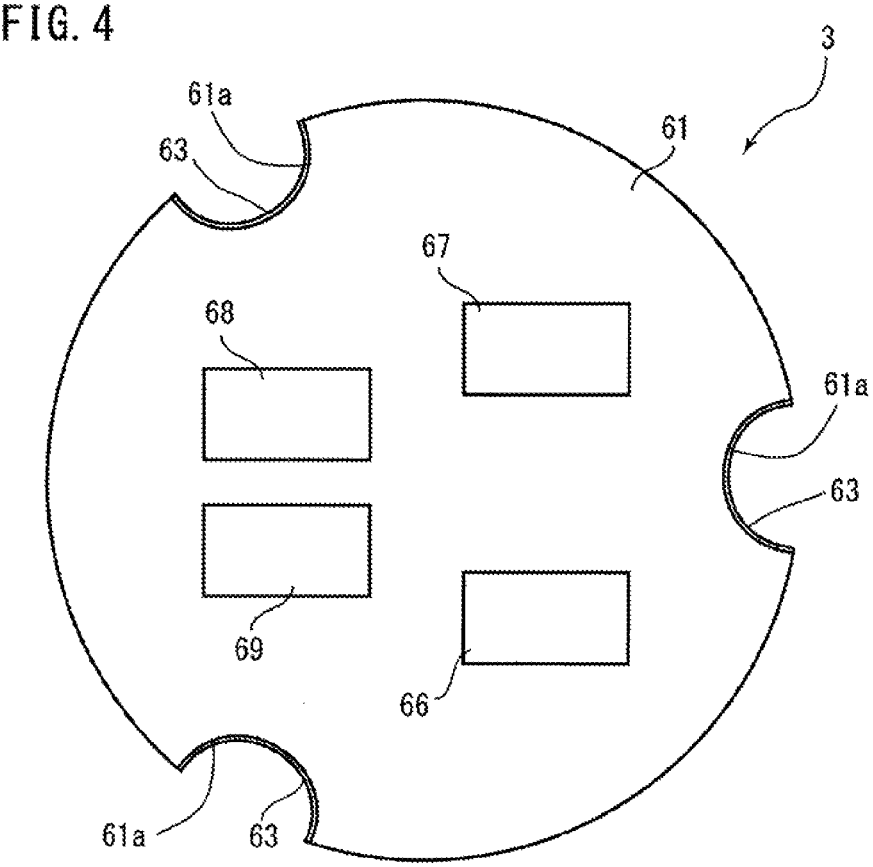
FIG. 4 is a top view of a general structure of a circuit substrate.

As shown in FIGS. 1, 2 and 4, the circuit substrate 61 is formed to have a shape (circular) and a size equal to those of the outer shape of the flat battery 2 when seen in a plan view. In this way, the battery unit 1 can be prevented from having a larger size than the diameter of the flat battery 2 because of the circuit substrate 61.

The circuit substrate 61 is provided with three semicircular notches 61a at its outer circumference. These notches 61a are provided at intervals of about 120° on the outer circumferential side of the circuit substrate 61. The notches 61a are each provided with a substrate side terminal 63 formed for example by plating tin at a side surface of the circuit substrate 61. Although not shown, the substrate side terminals 63 provided at the notches 61a are electrically connected to a circuit (not shown) formed by the circuit components 62 mounted on the circuit substrate 61.

As described above, providing the substantially semicircular notches 61a provided at the circuit substrate 61 makes it easier for solder to be distributed when the substrate side terminals 63 formed on the notches 61a are connected to the battery side negative terminal 81 and the battery side positive terminal 82 of the flat battery 2 by soldering as will be described. In this way, the substrate side terminals 63 of the circuit substrate 61 and the battery side negative terminal 81 and the battery side positive terminal 82 of the flat battery 2 can be connected more securely by soldering.

As shown in FIG. 2, the notches 61a are covered with the tube 4 that covers the side surface of the layered body including the flat battery 2 and the circuit portion 3. In this way, the substrate side terminals 63 provided at the notches 61a can be prevented from being exposed.

As shown in FIGS. 1, 2, 4, and 6, a GND terminal 66, an output terminal 67, a charging terminal 68, and a charging indication signal terminal 69 are provided at a surface of the circuit substrate 61 without the circuit components 62. More specifically, as shown in FIG. 1, the plurality of circuit components 62 are mounted on one surface of the circuit substrate 61 and the terminals 66 to 69 are provided together on the other surface. The circuit substrate 61 also has a plurality of through holes and a metal material filled in the through holes electrically connects the circuit (not shown) formed by the circuit components 62 on the circuit substrate 61 and the terminals 66 to 69. Note that the terminals 66 to 69 may be provided in positions other than those shown in FIGS. 1, 2, 4, and 6.

In this way, the circuit (not shown) formed by the circuit components 62 on the circuit substrate 61 and the terminals 66 to 69 are electrically connected and the substrate side terminals 63 and the circuit (not shown) on the circuit substrate 61 are electrically connected as described above, so that the terminals 66 to 69 and the substrate side terminals 63 can be connected electrically. In this way, when the substrate side terminals 63 are connected with a battery side negative electrode terminal 81 and a battery side positive electrode terminal 82 of the flat battery 2, the flat battery 2 and the terminals 66 to 69 can be connected electrically as will be described. Therefore, the flat battery 2 can be charged/discharged through these terminals 66 to 69.

Note that the GND terminal 66, the output terminal 67, the charging terminal 68, and the charging indication signal terminal 69 are formed inwardly in the radial direction of the circuit substrate 61, of the tube 4 positioned at an end surface of the layered body so that the terminals do not overlap the tube 4 that covers the side surface of the layered body including the flat battery 2 and the circuit portion 3.

As shown in FIG. 1, the circuit substrate 61 is held on the negative battery can 20 of the flat battery 2 through a spacer 71. More specifically, the circuit substrate 61 is adhesively fixed to the negative electrode can 20 by an elastic adhesive as it is provided a prescribed distance apart from the negative electrode can 20 of the flat battery 2 by the spacer 71. In other words, the elastic adhesive is filled between the circuit substrate 61 and the negative electrode can 20 of the flat battery 2. In this way, the circuit substrate 61 is provided at the negative electrode can 20 that is less prone to deformation in the flat battery 2, so that if the flat battery 2 deforms, electrical connection between the circuit portion 3 and the flat battery 2 can be secured.

The spacer 71 may be a member of a resin material such as ABS resin (acrylonitrile butadiene styrene copolymer synthetic resin) and phenolic resin and has a substantially donut shape. As shown in FIG. 1, the spacer 71 has a thick outer circumferential part along a stepped portion between the negative electrode can 20 and the positive electrode can 10 of the flat battery 2 so as to fill the stepped portion. More specifically, the spacer 71 is formed to extend to the caulking part (hereinafter also referred to as the "shoulder") of the positive electrode can 10 to the negative electrode can 20. The spacer 71 has a thickness to form a prescribed distance between the flat battery 2 and the circuit substrate 61 so that the circuit components 62 do not contact the flat battery 2 (see FIG. 1). In this way, while a space for providing the circuit components 62 is provided on the negative electrode can 20 of the flat battery 2, the circuit components 62 can be prevented from contacting the flat battery 2 and being damaged if the flat battery 2 deforms.

The circuit substrate 61 is placed on the spacer 71 so that the circuit components 62 are positioned inside of the substantially donut shaped spacer 71 (see FIG. 1). In this way, the circuit substrate 61 having the circuit components 62 mounted thereon can be provided in a compact manner with respect to the flat battery 2. The above-described arrangement keeps the circuit components 62 from being exposed to the outside of the battery unit 1, and therefore a user or anyone can be prevented from contacting the circuit components 62.

Note that since the elastic adhesive is filled between the circuit substrate 61 and the negative electrode can 20 of the flat battery 2 as described above, the elastic adhesive is also filled at the periphery of the circuit components 62 provided inside of the substantially donut shaped spacer 71.

Structure of Battery Side Terminals

Figure 5:
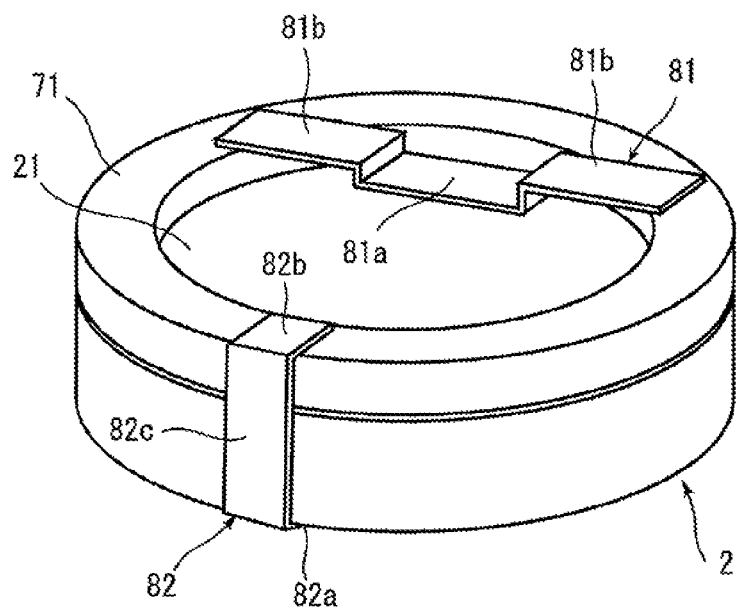
FIG. 5 is a perspective view showing a state in which the flat battery provided with a battery side negative electrode terminal and a battery side positive electrode terminal is assembled with a spacer.

As shown in FIGS. 1 and 5, the battery side negative electrode terminal 81 (battery side terminal) is provided on a flat surface 21 of the negative electrode can 20 of the flat battery 2. The battery side negative electrode terminal 81 is formed by bending a rectangular plate member of a conductive metal material so that the lengthwise center of the plate member protrudes in the thickness-wise direction. More specifically, the battery side negative electrode terminal 81 is a member including, in an integral form, a battery connection portion 81a connected to the flat surface 21 of the negative electrode can 20 of the flat battery 2 and substrate connection portions 81b on both sides of the battery connection portion 81a. The battery connection portion 81a protrudes from the substrate connection portions 81b in the thickness-wise direction of the member. The battery connection portion 81a protrudes from the substrate connection portions 81b by such a height that the substrate connection portions 81b of the battery side negative electrode terminal 81 attached to the flat battery 2 with the spacer 71 placed on the flat battery 2 is positioned on the spacer 71.

The battery connection portion 81a is fixed to the flat surface 21 of the negative electrode can 20 of the flat battery 2 by welding. More specifically, the battery connection portion 81a has its surface on the protruding side of the battery side negative electrode terminal 81 fixed to the flat surface 21 of the negative electrode can 20 by welding so that the substrate connection portions 81b of the battery side negative electrode terminal 81 are placed on the spacer 71. In this way, the battery side negative electrode terminal 81 can be fixed to the flat battery 2. Furthermore, the battery connection portion 81a forms a part dented from the substrate connection portions 81b, and therefore the circuit components 62 mounted to the circuit substrate 61 can be provided in the dent. Therefore, a larger number of circuit components 62 can be provided between the circuit substrate 61 and the flat battery 2 in a compact manner.

Figure 6:
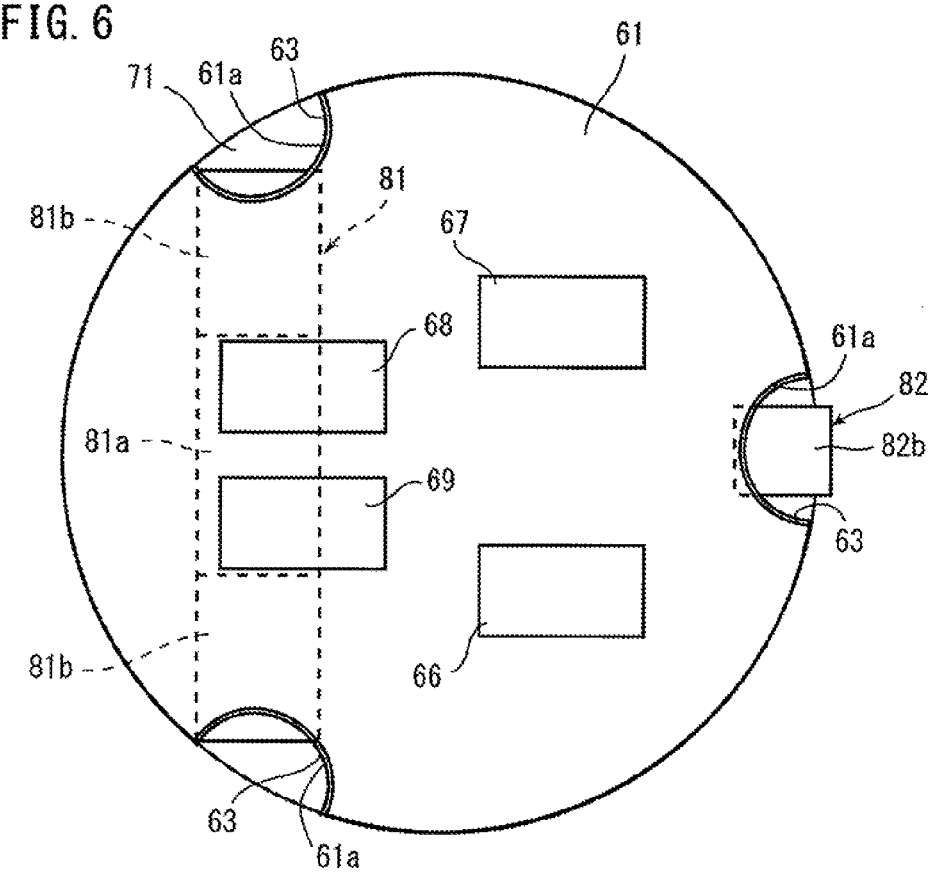
FIG. 6 is a top view showing a state in which a circuit substrate is placed on the structure shown in FIG. 5.

The substrate connection portions 81b are fixed to the circuit substrate 61 by soldering. More specifically, as shown in FIG. 6, the substrate connection portions 81b are soldered with the substrate side terminals 63 while the substrate side terminals 63 provided in the notches 61a of the circuit substrate 61 are positioned on the substrate connection portions 81b. In this way, the substrate connection portions 81b are connected to the side surface of the circuit substrate 61.

As shown in FIGS. 1 and 5, the battery side positive electrode terminal 82 (battery side terminal) is provided to hold the flat battery 2 and the spacer 71 in the thickness-wise direction. The battery side positive electrode terminal 82 is made of a plate member of a conductive metal material and has its one end fixed to the bottom 11 of the positive electrode can 10 of the flat battery 2 by welding and its other end positioned on an upper surface of the spacer 71.

More specifically, as shown in FIG. 5, the battery side positive electrode terminal 82 has a battery connection 82a connected to the base 11 of the positive electrode can 10, a substrate connection portion 82b connected to the circuit substrate 61 on the spacer 71, and a coupling portion 82c that connects the battery connection portion 82a and the substrate connection portion 82b. The battery connection portion 82a and the substrate connection portion 82b are bent in the same direction with respect to a coupling portion 82c. In this way, the battery side positive electrode terminal 82 can be provided to hold the flat battery 2 and the spacer 71 in the thickness-wise direction.

The substrate connection portion 82b and the circuit substrate 61 are fixed by soldering. More specifically, as shown in FIG. 6, the substrate connection portion 82b is soldered with the substrate side terminals 63 while the substrate side terminals 63 provided in the notches 61a of the circuit substrate 61 are positioned on the substrate connection portion 82b. In this way, the substrate connection portion 82b is connected to the side surface of the circuit substrate 61.

As shown in FIGS. 1 and 5, the substrate connection portion 82b is formed to be shorter than the width of the ring-shaped spacer 71 in the radial direction. In this way, when the circuit substrate 61 is provided on the substrate connection portion 82b, the substrate connection portion 82b can be prevented from deforming.

In the above-described structure, the plurality of notches 61a are provided on the outer circumferential side of the circuit substrate 61 and the substrate side terminals 63 formed in the notches 61a and the battery side negative electrode terminal 81 and the battery side positive electrode terminal 82 of the flat battery 2 are electrically connected. In this way, the circuit formed on the circuit substrate 61 and the battery side negative terminal 81 and the battery side positive electrode terminal 82 of the flat battery 2 can be connected electrically on the side surface of the circuit substrate 61. Therefore, as compared to the case of soldering tip ends of terminals provided through a circuit substrate, the battery unit 1 can have a reduced thickness. More specifically, in the above-described structure, a tip end of a terminal does not project from the circuit substrate or the thickness is not increased because of the solder, and therefore the thickness of the battery unit 1 can be reduced.

As described above, the circuit substrate 61 is supported by the three substrate connection portions 81b and 82b provided at the battery side negative electrode terminal 81 and the battery side positive electrode terminal 82 connected to the flat battery 2, and therefore the circuit substrate 61 can be supported in a stable manner.

Method of Manufacturing Battery Unit

Now, a method of manufacturing the battery unit 1 having the above-described structure will be described with reference to FIGS. 6 to 8.

Figure 7:
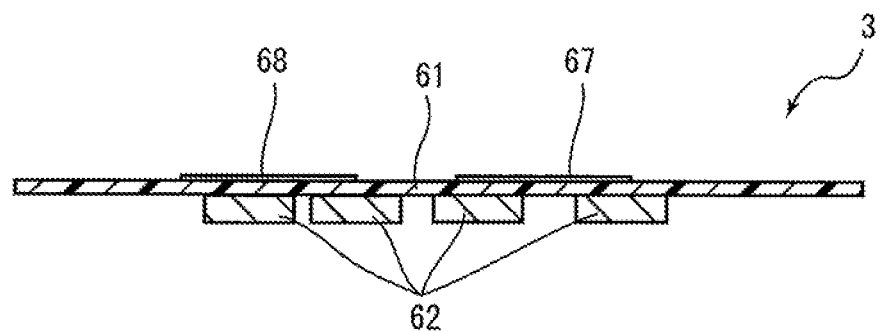
FIG. 7 is a sectional view of a general structure of a circuit substrate produced according to an example of a method of manufacturing a battery unit.

As shown in FIG. 7, the plurality of circuit components 62 are mounted on one surface of the circuit substrate 61 to form the circuit portion 3. The various kinds of terminals 66 to 69 are formed on the other surface of the circuit substrate 61. A method of mounting the circuit components 62 to the circuit substrate 61 and a method of forming the terminals 66 to 69 are the same as conventional methods, and therefore will not be described in detail.

Figure 8:
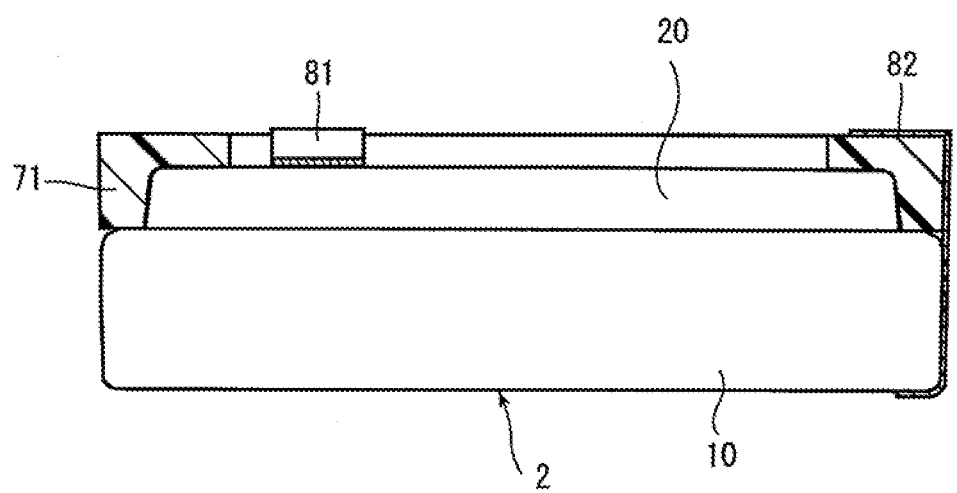
FIG. 8 is a view showing a state in which a spacer is attached to a flat battery according to an example of a method of manufacturing a battery unit.

On the other hand, as shown in FIG. 8, the spacer 71 is adhesively fixed on the flat battery 2 by an elastic adhesive and the battery side negative electrode terminal 81 and the battery side positive electrode terminal 82 are fixed to the flat battery 2 by welding.

Then, the circuit substrate 61 of the circuit portion 3 is provided to the flat battery 2 provided with the spacer 71, the battery side negative electrode terminal 81, and the battery side positive electrode terminal 82 (see FIG. 6). Then, the substrate side terminals 63 provided in the notches 61a of the circuit substrate 61 and the battery side negative electrode terminal 81 and the battery side positive electrode terminal 82 are connected by soldering. Note that when the circuit portion 3 is assembled to the flat battery 2, an elastic adhesive or the like is filled between the circuit substrate 61 and the flat battery 2.

Then, the elastic adhesive is cured to integrate the flat battery 2, the spacer 71, and the circuit substrate 61. Thereafter, a side surface of the layered body including the flat battery 2 and the circuit portion 3 formed as described above is heated while the side surface is covered with a tube 4, so that the tube 4 is let to shrink. Note that the tube 4 has a length to cover a part of the outer circumference of both end surfaces of the layered body as it is fitted to the side surface of the layered body.

In this way, the battery unit 1 having the structure as shown in FIG. 1 is obtained.

Figure 9:
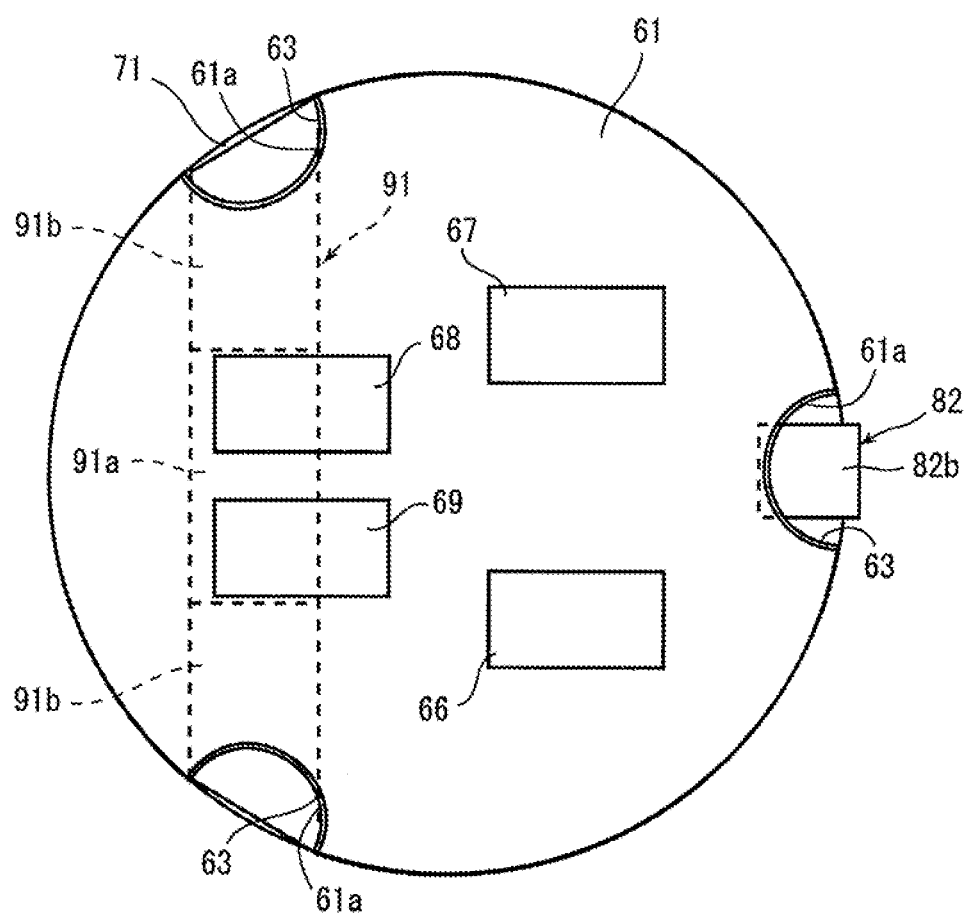
FIG. 9 is a view equivalent to FIG. 6 in which both ends of the battery side negative electrode terminal are formed obliquely.

Note that according to the embodiment, the battery side negative electrode terminal 81 is formed by a rectangular plate member. However, as shown in FIG. 9, a lengthwise end of a battery side negative electrode terminal 91, or an end of a substrate connection portion 91b may be formed obliquely to fit along the outer shape of the spacer 71. More specifically, while the circuit substrate 61 is provided on the spacer 71 as shown in FIG. 9, the end of the substrate connection portion 91b of the battery side negative electrode terminal 91 may be formed obliquely so that the spacer 71 is almost hardly exposed in the notches 63 of the circuit substrate 61. This increases the range of connection between the substrate connection portion 91b of the battery side negative electrode terminal 91 and the substrate side terminals 63 of the circuit substrate 62, and therefore they may be connected easily and more firmly by soldering. Note that in FIG. 9, 91a designates a battery connection portion.

Advantages of First Embodiment

According to the embodiment, the circuit portion 3 is attached to the flat battery 2 in an integral manner to form the battery unit 1. The circuit substrate 61 of the circuit portion 3 has the plurality of notches 61a at its outer circumference. The substrate side terminals 63 are provided on the side surface of the circuit substrate 61 in the notches 61a. In this structure, the side surface of the circuit substrate 61 is soldered with the battery side negative electrode terminal 81 and the battery side positive electrode terminal 82, so that the circuit substrate 61 and the flat battery 2 can be connected electrically. Therefore, as compared to the case of soldering the tip ends of the terminals to the substrate as the tip ends are provided through the substrate, the thickness of the battery unit 1 as a whole can be reduced for the thickness of the otherwise protruding tip ends of the terminals and the thickness of the solder. In addition, since the tip ends of the terminals do not protrude from the substrate, the terminals can be prevented from short-circuiting.

Furthermore, the substantially semicircular notches 61a of the circuit substrate 61 allow solder to be distributed in a wide range of the substrate side terminals 63 when the substrate side terminals 63 formed in the notches 61a and the battery side negative electrode terminal 81 and the battery side positive electrode terminal 82 of the flat battery 2 are soldered. This allows the substrate side terminals 63 of the circuit substrate 61 and the battery side negative electrode terminal 81 and the battery side positive electrode terminal 82 of the flat battery 2 to be surely connected by soldering.

The circuit substrate 61 is supported at three points by the battery side negative electrode terminal 81 and the battery side positive electrode terminal 82 of the flat battery 2, so that the circuit substrate 61 can be supported in a stable manner. In this way, the circuit substrate 61 can be prevented from being skewed and contacting the flat battery 2.

In addition, in the battery side negative electrode terminal 81, the lengthwise center of the rectangular plate member is dented to form the battery connection portion 81a, and therefore the circuit components 62 mounted on the circuit substrate 61 can be provided in the dent formed in the battery connection portion 81a. Therefore, a larger number of the circuit components 62 can be provided in a compact manner between the circuit substrate 61 and the flat battery 2.

Furthermore, as the battery side negative electrode terminal 81 has the above-described structure, the substrate connection portions 81b and 82b of the battery side negative electrode terminal 81 and the battery side positive electrode terminal 82 are provided on the spacer 71. In this way, the substrate connection portions 81b and 82b can be prevented from deforming when the circuit substrate 61 is supported by these substrate connection portions 81b and 82b.

The terminals 66 to 69 are provided together on a surface of the circuit substrate 61 of the circuit portion 3 on the opposite side to the flat battery 2, so that the terminals 66 to 69 can be provided in positions overlapping the flat battery 2 in a plan view. In this way, the battery unit 1 can be reduced in size. Furthermore, the circuit components 62 are mounted together on the surface of the circuit substrate 61 that is adjacent the flat battery 2, so that the circuit components 62 can be prevented from being exposed to the outside of the battery unit 1. A user can be prevented from directly touching the circuit components 62 upon touching the battery unit 1.

Second Embodiment

Figure 10:
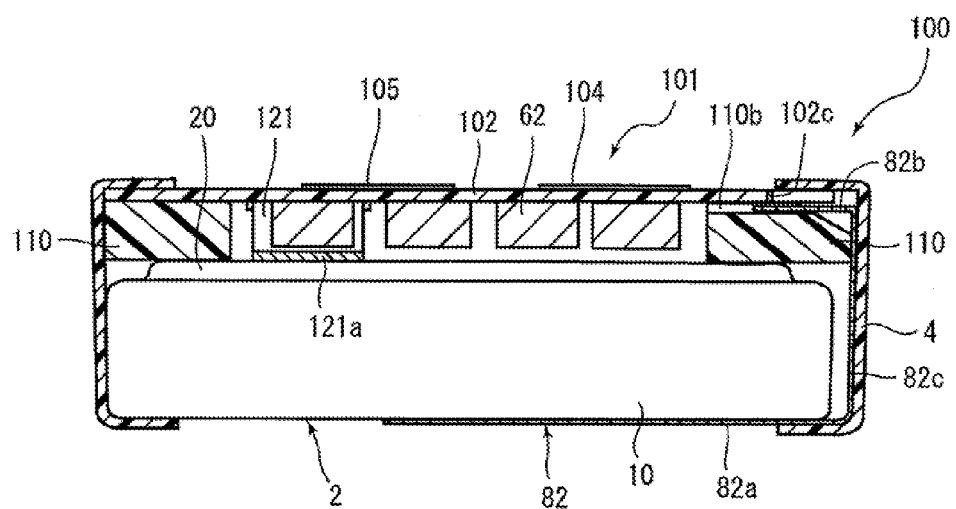
FIG. 10 is a view equivalent to FIG. 1 showing a battery unit according to a second embodiment of the invention.

FIG. 10 is a schematic view of a battery unit 100 according to a second embodiment of the present invention. In the battery unit 100 according to the second embodiment, a circuit substrate 102, a spacer 110, and a battery side negative electrode terminal 121 have different structures from those according to the first embodiment. In the following, the same portions as those according to the first embodiment are designated by the same reference characters and will not be described. Only the portions different from the first embodiment will be described.

Overall Structure

FIG. 10 is a schematic view of the battery unit 100 according to the second embodiment of the present invention. The battery unit 100 includes a coin-shaped flat battery 2 and a circuit portion 101 in an integral form similarly to the battery unit 1 according to the first embodiment. Note that the battery unit 100 is also a secondary battery unit in which the flat battery 2 can be charged/discharged.

More specifically, as shown in FIG. 10, in the battery unit 100, the circuit portion 101 is fixed on the flat battery 2. The circuit portion 101 has a shape and a size equal to the outer shape of the flat battery 2 when viewed in a direction in which the flat battery 2 and the circuit portion 101 are layered on each other similarly to the circuit portion 3 according to the first embodiment. In this way, the battery unit 100 can have a size equal to that of the outer shape of the flat battery 2 when viewed in the direction in which the flat battery 2 and the circuit portion 101 are layered on each other.

Figure 11:
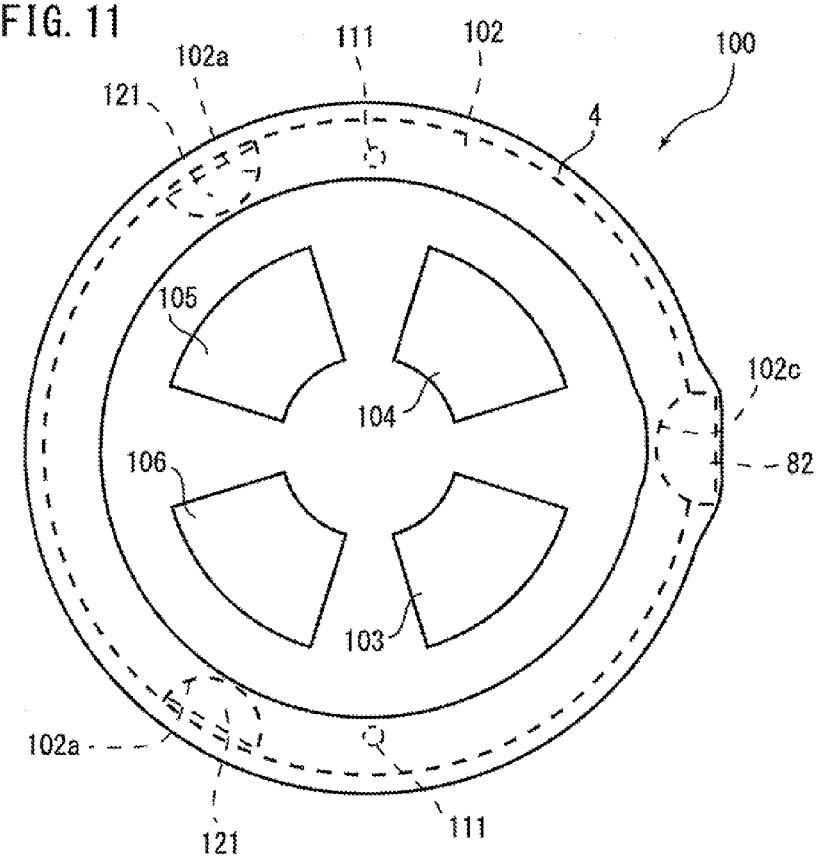
FIG. 11 is a view equivalent to FIG. 2 showing the battery unit according to the second embodiment.

As will be described in detail, various terminals 103 to 106 are formed on a surface of the circuit substrate 102 of the circuit portion 101 on the opposite side to the flat battery 2 (see for example FIG. 11). In this way, the battery unit 100 has only the terminals 103 to 106 exposed while the flat battery 2 and the circuit portion 101 are assembled as shown in FIG. 11 similarly to the battery unit 1 according to the first embodiment. Note that as shown in FIG. 11, a side surface of the layered body formed by fixing the flat battery 2 and the circuit portion 3 in a layered state is covered with a tube 4 similarly to the first embodiment.

Structure of Circuit Portion

Now, the structure of the circuit portion 101 will be described in conjunction with FIGS. 10, 11, and 14.

As shown in FIG. 10, the circuit portion 101 includes a circuit substrate 102 (substrate) and a plurality of circuit components 62 mounted on the circuit substrate 102 similarly to the circuit portion 3 according to the first embodiment. The position of a notch 102c among notches 102a and 102c formed at the outer circumference of the circuit substrate 102 and the shapes of the terminals 103 to 106 formed at the surface of the circuit substrate 102 are different from those of the circuit substrate 61 according to the first embodiment. The notches 102a and 102c have the same structure as the notch 61a according to the first embodiment except for the position of the notch 102c on the circuit substrate 102. The terminals 103 to 106 have the same structures as those of the terminals 66 to 69 according to the first embodiment except for the shape.

Figure 14:
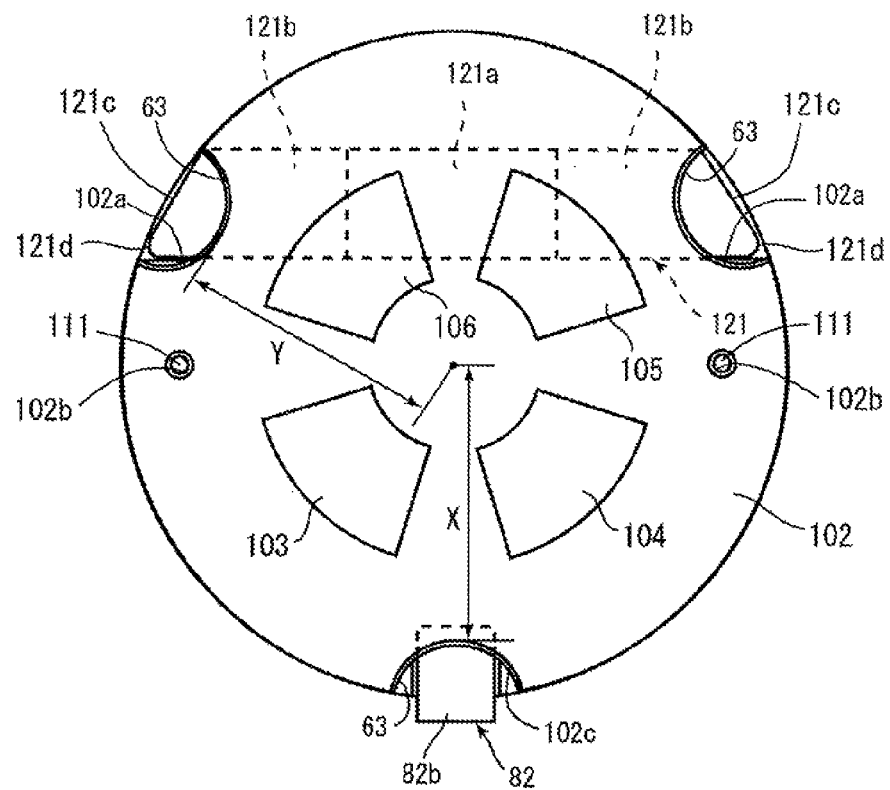
FIG. 14 is a view equivalent to FIG. 6 showing the battery unit according to the second embodiment.

According to the embodiment, as shown in FIGS. 11 and 14, among the three notches 102a and 102c, the notch 102c in which the battery side positive electrode terminal 82 is positioned is provided more outwardly with respect to the circuit substrate 102 than the other notches 102a. More specifically, the semi-circular notch 102c has its central position in the radial direction of the circuit substrate located more outwardly with respect to the circuit substrate 102 than the central position of the other notches 102a. As shown in FIG. 14, the notch 102c is provided at the circuit substrate 102 so that the distance X from the center of the circuit substrate 102 to the inner most position of the circuit substrate 102 is greater than the distance Y for the other notches 102a. Note that the 102a and 102c have semi-circular shapes having the same radius.

As shown in FIG. 11, the outer circumferential edge of the circuit substrate 102 at which the notches 102a and 102c are provided is covered with the tube 4 that covers the side surface of the layered body of the flat battery 2 and the circuit portion 3. As will be described, the battery side positive electrode terminal 82 projects outwardly in the radial direction of the circuit substrate 102 in a plan view. Therefore, the part of the battery side positive electrode terminal 82 covered with the tube 4 also projects outwardly in the radial direction of the circuit substrate 102. Therefore, the part of the tube 4 that covers the battery side positive electrode terminal 82 is positioned more outwardly with respect to the circuit substrate 102 than the other part.

In contrast, as the notch 102c is provided in the above-described position, the substrate side terminal 63 in the notch 102c can be prevented from being exposed when the tube 4 is positioned more outwardly with respect to the circuit substrate 102 than the other part because of the battery side positive electrode terminal 82. More specifically, the notch 102c in which the battery side positive electrode terminal 82 is positioned is more outwardly in the radial direction of the circuit substrate 102 than the other notches 102a and can be covered by the tube 4 stretched outwardly in the radial direction of the circuit substrate 102 by the battery side positive electrode terminal 82.

As shown in FIGS. 10, 11, and 14, on the surface of the circuit substrate 102 without the circuit components 62 thereon, the GND terminal 103, the output terminal 104, the charging terminal 105, and the charging indication signal terminal 106 are provided. As shown in FIGS. 11 and 14, the GND terminal 103, the output terminal 104, the charging terminal 105, and the charging indication signal terminal 106 are each formed to have a sector shape and provided in a circle in a circumferential direction on the circuit substrate 102. The GND terminal 103, the output terminal 104, the charging terminal 105, and the charging indication signal terminal 106 are provided in the central part of the circuit substrate 102 in a plan view. In this way, the GND terminal 103, the output terminal 104, the charging terminal 105, and the charging indication signal terminal 106 can be prevented from overlapping the tube 4 that covers the side surface of the layered body of the flat battery 2 and the circuit portion 101 while the GND terminal 103, the output terminal 104, the charging terminal 105, and the charging indication signal terminal 106 can have the largest possible area.

As shown in FIG. 14, circular holes 102b are provided in two positions in the circumferential direction and more outwardly than the GND terminal 103, the output terminal 104, the charging terminal 105, and the charging indication signal terminal 106. These holes 102b are provided at an interval of 180° in the circumferential direction of the circuit substrate 102. Each of the holes 102b is provided through the circuit substrate 102 and formed to have such a size that the projection 111 of the spacer 110 (that will be described) can be inserted therein. Note that the holes 102b do not have to penetrate through the circuit substrate 102. In the latter case, the holes 102b are formed to open at the surface of the circuit substrate 120 mounted with the circuit components 62 thereon.

Structure of Battery Side Terminals

Now, with reference to FIGS. 10 and 12 to 14, the structure of the battery side negative electrode terminal 121 and the battery side positive electrode terminal 82 will be described.

Figure 12:
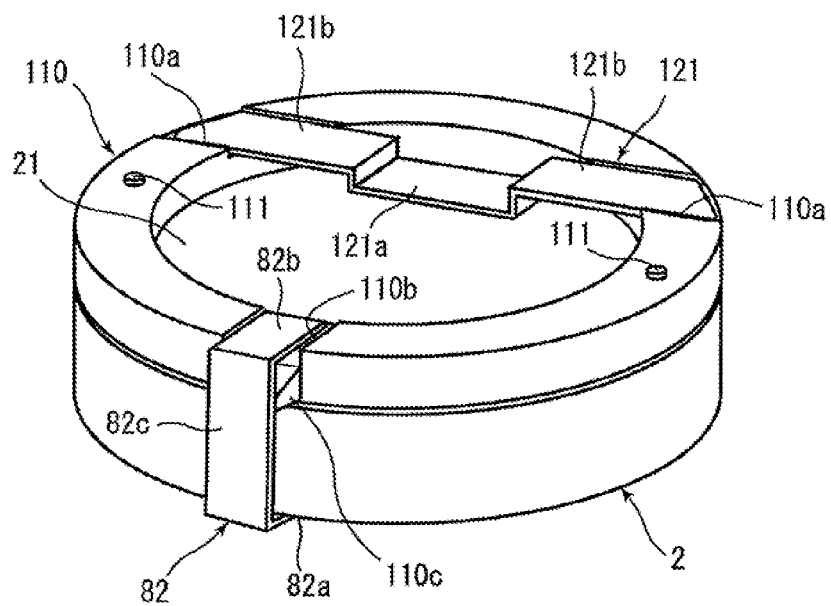
FIG. 12 is a view equivalent to FIG. 5 showing the battery unit according to the second embodiment.

As shown in FIGS. 10 and 12, the battery side negative electrode terminal (battery side terminal) 121 is provided on the flat surface 21 of the negative electrode can 20 of the flat battery 2. As shown in FIG. 12, the battery side negative electrode terminal 121 has the same structure as that of the battery side negative electrode terminal 81 according to the first embodiment except for the shape of both ends in the lengthwise direction. More specifically, the battery side negative electrode terminal 121 is a member that includes, in an integral form, a battery connection portion 121a connected to the flat surface 21 of the negative electrode can 20 of the flat battery 2 and substrate connection portions 121b positioned on both sides of the battery connection portion 121a in the lengthwise direction. The battery connection portion 121a protrudes with respect to the substrate connection portions 121b in the thickness-wise direction of the member. The battery connection portion 121a protrudes with respect to the substrate connection portions 121b for such a height that the substrate connection portions 121b of the battery side negative electrode terminal 121 attached to the flat battery 2 are positioned on the spacer 110 as the spacer 110 is placed on the flat battery 2. More specifically, the height of the protruding part of the battery connection portion 121a with respect to the substrate connection portions 121b is equal to the thickness of the spacer 110 at a groove 110a (that will be described) provided at the spacer 110.

The battery connection portion 121a is fixed to the flat surface 21 of the negative electrode can 20 of the flat battery 2 by welding. More specifically, in the battery connection portion 121a, a surface of the battery side negative electrode terminal 121 on the protruding side is fixed to the flat surface 21 of the negative electrode can 20 by welding so that the substrate connection portions 121b of the battery side negative electrode terminal 121 are placed on the spacer 110. In this way, the battery side negative electrode terminal 121 can be fixed to the flat battery 2. In addition, a dent in a lower position than the substrate connection portions 121b is formed by the battery connection portion 121a in the battery side negative electrode terminal 121, and therefore the circuit components 62 mounted on the circuit substrate 102 can be provided in the dent.

Note that the battery connection portion 121a has such a length that it does not contact the inner circumference of the spacer 110 while the substrate connection portions 121b are provided in the grooves 110a (that will be described) provided in the spacer 110. Considering that the circuit components 62 are positioned on the battery connection portion 121a as described above, the battery connection portion 121a is preferably as far as possible in a range that it does not contact the inner circumference of the spacer 110.

The substrate connection portions 121b are fixed to the circuit substrate 102 by soldering. More specifically, as shown in FIG. 14, the substrate connection portions 121b are soldered with the substrate side terminals 63 while the substrate side terminals 63 provided in the notches 102a of the circuit substrate 102 are positioned on the substrate connection portions 121b. In this way, the substrate connection portions 121b are connected to the side surface of the circuit substrate 102. The surfaces of the lengthwise ends of the battery side negative electrode terminal 121 at the substrate connection portions 121b are plated with tin (the hatched parts in FIG. 13). In this way, the substrate connection portions 121b and the substrate side terminals 63 can be connected more securely by soldering.

Figure 13:
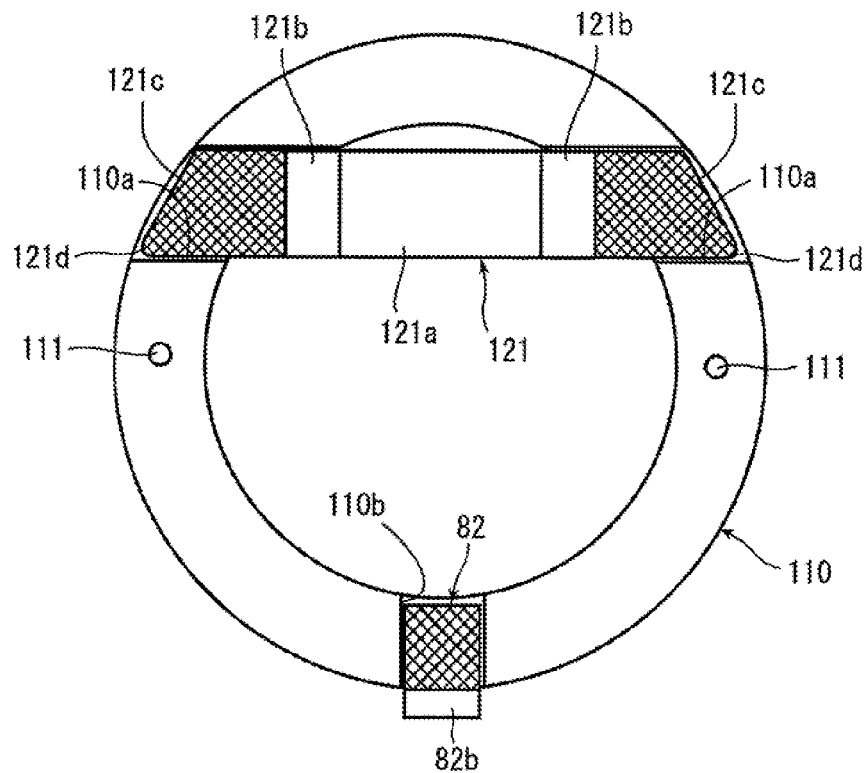
FIG. 13 is a top view of the structure shown in FIG. 12.

As shown in FIGS. 13 and 14, the substrate connection portion 121b has its tip end 121c formed obliquely as viewed in the thickness-wise direction of the circuit substrate 102 so as to connect the outer circumferential sides of the circuit substrate 102 in the notches 102a. More specifically, the substrate connection portion 121b projects in the notch 102a so that the tip end 121c forms a part of the outer shape of the circuit substrate 102. Therefore, the substrate connection portion 121b is formed in a trapezoidal shape as a whole in a plan view. In this way, as compared to the case of forming the substrate connection portion 121b in a rectangular shape in a plan view, the area of the projecting parts of the substrate connection portions 121b into the notches 102a of the circuit substrate 102 can be increased. Therefore, the substrate connection portions 121b and the substrate side terminals 63 can be connected readily and more surely by soldering.

Furthermore, at an acute angle part of the tip end 121c of the substrate connection portion 121b is provided with an R (rounded) part 121d. The R part 121d can more surely prevent the substrate connection portion 121b from projecting outwardly in the radial direction beyond the spacer 110. Furthermore, the presence of the R part 121d provided at the acute tip end part of the substrate connection portion 121b can prevent the tip end part from penetrating through the tube 4 even if the tip end part projects outwardly in the radial direction beyond the spacer 110.

As shown in FIGS. 10 and 12, the battery side positive electrode terminal 82 (battery side terminal) is provided to hold the flat battery 2 and the spacer 110 in the thickness-wise direction. The battery side positive electrode terminal 82 has the same structure as that according to the first embodiment and therefore will not be described in detail.

According to the embodiment, the battery side positive electrode terminal 82 is attached to the flat battery 2 so that the coupling portion 82c is parted from a side surface of the flat battery 2. More specifically, the battery side positive electrode terminal 82 is attached to the flat battery 2 while the coupling portion 82c is in contact with a projection 110c provided at the spacer 110 as will be described. As described above, the battery side positive electrode terminal 82 projects outwardly in the radial direction of the flat battery 2. As will be described, the battery side positive electrode terminal 82 serves as a projecting part used to position the battery unit 100 in the circumferential direction.

Spacer

In the following, with reference to FIGS. 10, 12, 13, and 15, the structure of the spacer 110 will be described.

Figure 15:
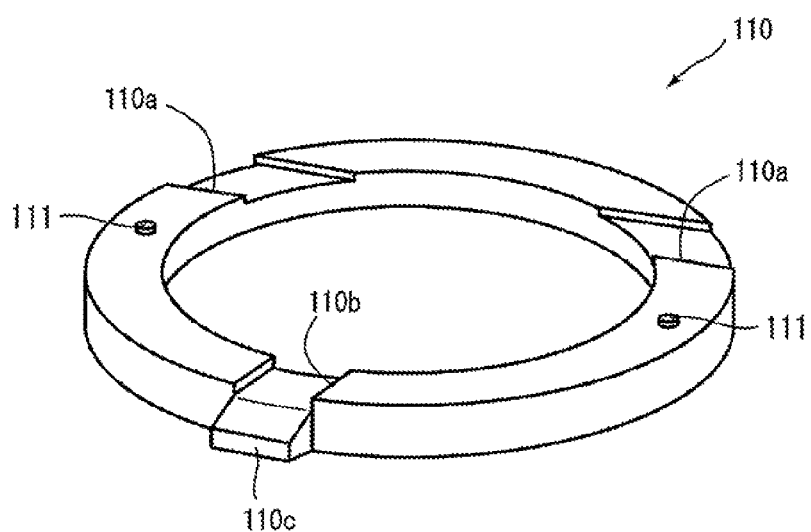
FIG. 15 is a perspective view of a general structure of a spacer.

The spacer 110 is a member made of a resin material such as polycarbonate and formed in an annular shape as shown in FIGS. 12, 13, and 15. The spacer 110 is adhesively fixed to the negative electrode can 20 of the flat battery 2 by an adhesive.

More specifically, although not shown, the gap between the spacer 110 and the positive electrode can 10 of the flat battery 2 is filled with the adhesive. The circuit substrate 102 is provided on the spacer 110 so that the circuit components 62 are positioned inside the spacer 110. More specifically, the spacer 110 is positioned between the flat battery 2 and the circuit substrate 102.

The spacer 110 has such a thickness that the circuit substrate 102 and the flat battery 2 are provided at a prescribed distance that keeps the circuit components 62 from contacting the flat battery 2 (see FIG. 10). In this way, a space used to provide the circuit components 62 can be formed on the negative electrode can 20 of the flat battery 2.

As shown in FIGS. 12, 13, and 15, the spacer 110 has one end surface provided with grooves 110a and 110b in which the battery side negative electrode terminal 121 and the battery side positive electrode terminal 82 can be provided. More specifically, the grooves 110a and 110b are provided in three positions on a surface of the spacer 110 on the side provided with the circuit substrate 102.

The grooves 110a are provided in two positions across the spacer 110 in a plan view in the circumferential direction of the spacer 71 corresponding to the substrate connection portions 121b of the battery side negative electrode terminal 121. More specifically, the two grooves 110a are provided to extend in the same direction in opposing positions on the spacer 110. The substrate connection portions 121b of the battery side negative electrode terminal 121 are positioned in the grooves 110a. The grooves 110a have a depth greater than the thickness of the substrate connection portion 121b of the battery side negative electrode terminal 121. In this way, the substrate connection portion 121b can be prevented from projecting from an end surface of the spacer 110 that is adjacent the circuit substrate 102 while the substrate connection portion 121b of the battery side negative electrode terminal 121 is provided in the groove 110a.

The groove 110b is provided in one position in the circumferential direction of the spacer 110 corresponding to the substrate connection portion 82b of the battery side positive electrode terminal 82. The groove 110b is provided in a position to form a T shape at the spacer 110 together with the grooves 110a in a plan view. The substrate connection portion 82b of the battery side positive electrode terminal 82 is positioned in the groove 110b. The groove 110b has a depth greater than the thickness of the substrate connection portion 82b of the battery side positive electrode terminal 82. In this way, while the substrate connection portion 82b of the battery side positive electrode terminal 82 is positioned in the groove 110b, the substrate connection portion 82b can be prevented from projecting from an end surface of the spacer 110 that is adjacent the circuit substrate 102.

As shown in FIGS. 12 and 15, the part of the spacer 110 provided with the groove 110b has the projection 110c that projects outwardly in the radial direction of the spacer 110. The projection 110c is formed in a substantially rectangular shape in a plan view and has its tapered surface located adjacent the circuit substrate 102 so that the thickness is reduced toward the tip end. More specifically, the projection 110c has the tapered surface that is adjacent the circuit substrate 102 so that the thickness increases inwardly in the radial direction of the spacer 110.

The projection 110c is provided in the spacer 110 in this way, so that the battery side positive electrode terminal 82 provided in the groove 110b can be positioned outwardly in the radial direction of the spacer 110. More specifically, the battery side positive electrode terminal 82 having the substrate connection portion 82b provided in the groove 110b has its connection portion 82c contact the tip end of the projection 110c and thus projects outwardly in the radial direction of the spacer 110. In this way, the projection can be provided in one position in the circumferential direction of the battery unit 1. Therefore, if a device to which the battery unit 1 is mounted has a dent corresponding to the projection of the battery unit 1, the battery unit 1 can be mounted to the device while the unit is positioned to the device in the circumferential direction.

In addition, the projection 110c has the tapered part whose thickness is reduced toward the tip end at its surface that is adjacent the circuit substrate 102, and therefore the substrate connection portion 82b of the battery side positive electrode terminal 82 can easily be provided in the groove 110b. More specifically, as shown in FIGS. 10 and 12, the battery side positive electrode terminal 82 is formed to have a C shape, the tapered part of the projection 110c allows the space between the battery connection portion 82a of the battery side positive electrode terminal 82 and the substrate connection portion 82b to be easily increased when the substrate connection portion 82b of the battery side positive electrode terminal 82 is moved on the projection 110c. In this way, the substrate connection portion 82b of the battery side positive electrode terminal 82 can easily be positioned in the groove 110b, so that the flat battery 2 and the spacer 110 can be held in the thickness-wise direction by the battery side positive electrode terminal 82.

According to the embodiment, the projection 110c is tapered but a groove bottom surface of the groove 110b on the outer circumferential side of the spacer 110 may be tapered instead of providing the projection 110c.

As shown in FIGS. 12, 13, and 15, projections 111 for positioning are provided in two positions in the circumferential direction at the spacer 110 on the surface provided with the grooves 110a and 110b, in other words on the surface that is adjacent the circuit substrate 102. The projections 111 are formed to have a circular column shape so that they can easily be inserted in the circular holes 102b provided at the circuit substrate 102. The projections 111 are inserted in the holes 102b of the circuit substrate 102, so that the circuit substrate 102 can be positioned to the spacer 110.

The two projections 111 are provided on the opposite sides with the central part of the spacer 110 held therebetween in a plan view. More specifically, the two projections 111 are provided at an interval of 180° in the circumferential direction on the spacer 110. In this way, as the two projections 111 are inserted in the holes 102b of the circuit substrate 102, the circuit substrate 102 can be positioned more surely with respect to the spacer 110. Note that in the examples shown in FIGS. 12, 13, and 15, the two projections 111 are formed next to the two grooves 110a, respectively. However, the two projections 111 may be provided in any other arrangement than the above.

Note that one projection 111 or three or more projections 111 may be provided for one spacer 110. If one projection 111 is provided for the spacer 110, the projection 111 preferably has a square column shape rather than a circular column shape. If one circular projection is provided, the circuit substrate 102 rotates relative to the spacer 110 while if the projection is a square column shape, the circuit substrate 102 does not rotate relative to the spacer 110 and therefore the circuit substrate 102 can easily be positioned with respect to the spacer 110.

Method of Manufacturing Battery Unit

Now, a method of manufacturing the battery unit 100 having the above-described structure will be described in conjunction with FIGS. 16 and 17.

Figure 16:
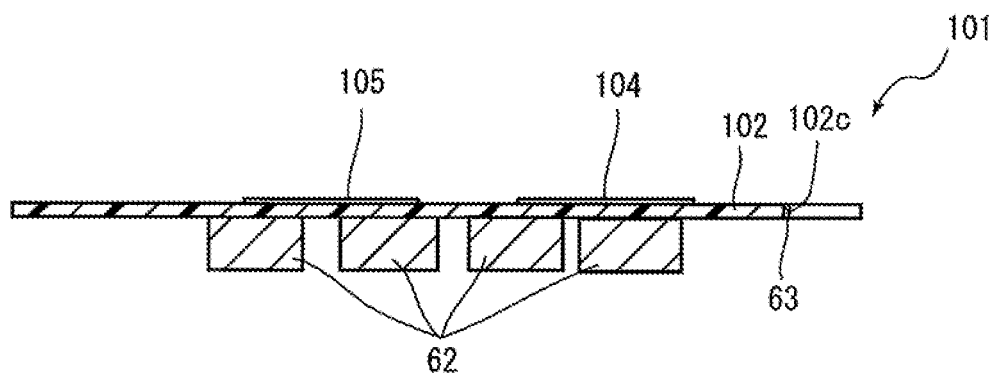
FIG. 16 is a view equivalent to FIG. 7 showing the battery unit according to the second embodiment.

As shown in FIG. 16, the plurality of circuit components 62 are mounted on one surface of the circuit substrate 102 provided with the notches 102a and the substrate side terminals 63 to form the circuit portion 101. The terminals 103 to 106 are formed on the other surface of the circuit substrate 102. The method of mounting the circuit components 62 on the circuit substrate 102 or the method of forming the terminals 103 to 106 on the circuit substrate 102 are the same as conventional methods and will not be described in detail.

Figure 17:
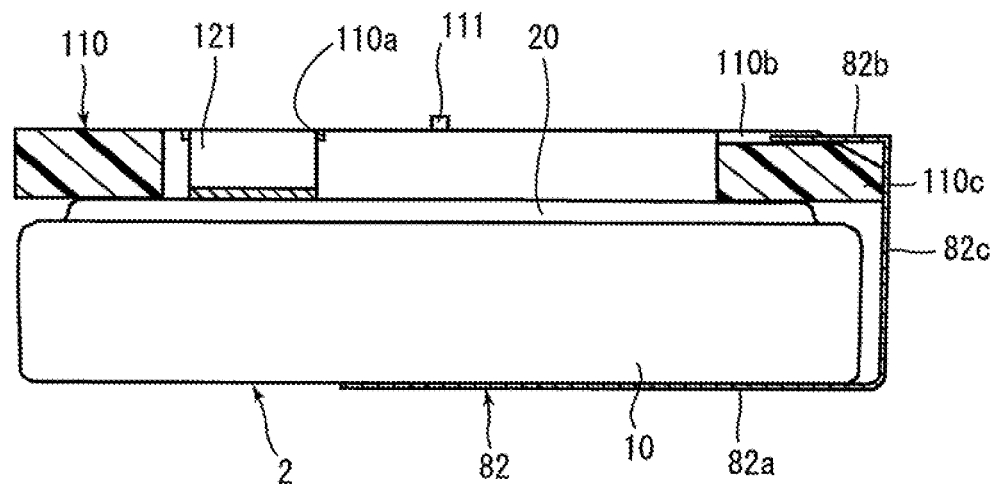
FIG. 17 is a view equivalent to FIG. 8 showing the battery unit according to the second embodiment.

On the other hand, as shown in FIG. 17, the spacer 110 is adhesively fixed on the flat battery 2 by an elastic adhesive and the battery side negative electrode terminal 121 and the battery side positive electrode terminal 82 are fixed to the flat battery 2 by welding. At the time, the battery side negative electrode terminal 121 is provided so that the substrate connection portions 121b are positioned in the grooves 110a at the spacer 110. The battery side positive electrode terminal 82 is provided so that the substrate connection portion 82b is positioned in the groove 110b at the spacer 110 and the coupling portion 82c is in contact with a tip end of the projection 110c of the spacer 110.

Thereafter, the circuit substrate 102 of the circuit portion 101 is provided to the flat battery 2 attached with the battery side negative electrode terminal 121 and the battery side positive electrode terminal 82 (see FIG. 14). At the time, the circuit substrate 102 is provided to the spacer 110 so that the circuit components 62 mounted at the circuit substrate 102 are positioned inside the spacer 110. The circuit substrate 102 is provided to the spacer 110 so that the projections 111 provided at the spacer 110 are inserted in the holes 102b of the circuit substrate 102. The substrate side terminals 63 provided in the notches 102a of the circuit substrate 102 and the battery side negative electrode terminal 121 and the battery side positive electrode terminal 82 are connected by soldering.

Then, a side surface of the layered body including the flat battery 2 and the circuit portion 101 formed as described above is covered with the tube 4 and heated, so that the tube 4 is made to shrink. Note that the tube 4 has a length to also cover a part of both end surfaces of the layered body that are located outwardly while it is fitted at the side surface of the layered body. In the circuit substrate 102, the notch 102c in which the battery side positive electrode terminal 82 is positioned is more outwardly in the radial direction than the other notches 102a, so that the substrate side terminals 63 provided in the notches 102a and 102c of the circuit substrate 102 are covered with the tube 4.

In this way, the battery unit 100 having the structure as shown in FIG. 10 is provided.

Advantages of Second Embodiment

According to the embodiment, the grooves 110a and 110b used to provide the battery side negative electrode terminal 121 and the battery side positive electrode terminal 82 are provided at the spacer 110 provided between the flat battery 2 and the circuit substrate 102. In this way, the battery side negative electrode terminal 121 and the battery side positive electrode terminal 82 can be provided on the bottom surface of the grooves 110a and 110b with a depth in the thickness-wise direction of the spacer 110 and therefore the thickness of the battery unit 100 can be prevented from increasing because of the battery side negative electrode terminal 121 and the battery side positive electrode terminal 82. Therefore, the battery unit 100 can be compact.

In addition, as the grooves 110a and 110b are provided in the spacer 110, the battery side negative electrode terminal 121 and the battery side positive electrode terminal 82 can readily be positioned in the grooves 110a and 110b, which alleviates positioning of the battery side negative electrode terminal 121 and the battery side positive electrode terminal 82. This alleviates the operation of assembling the battery unit 100, which improves the operation efficiency in assembling of the battery unit 100.

The grooves 110a and 110b have a depth greater than the thicknesses of the battery side negative electrode terminal 121 and the battery side positive electrode terminal 82, so that the battery side negative electrode terminal 121 and the battery side positive electrode terminal 82 can be prevented from projecting from the spacer 110 in the thickness-wise direction. In this way, the battery unit 100 can more surely be prevented from increasing in thickness.

According to the embodiment, the battery side positive electrode terminal 82 that electrically connects the flat battery 2 and the circuit substrate 102 projects outwardly in the radial direction beyond the flat battery 2 and the circuit substrate 102. This allows one projection to be provided in one position for the circular column-shaped battery unit 100. In this way, the battery unit 100 can be positioned in the circumferential direction of the battery unit 100. In other words, if a dent corresponding to the projection formed by the battery side positive electrode terminal 82 is formed on the side of a device to be mounted with the battery unit 100, the battery unit 100 can be positioned with respect to the device.

Furthermore, the projection 110c contacted by the battery side positive electrode terminal 82 is provided in the spacer 110 positioned between the flat battery 2 and the circuit substrate 102 in the battery unit 100, so that the battery side positive electrode terminal 82 can project more surely beyond the flat battery 2.

The groove 110b that can be provided with the battery side positive electrode terminal 82 is provided on a surface of the spacer 110 that is adjacent the circuit substrate 102 while the projection 110c is provided corresponding to the groove 110b, so that the battery side positive electrode terminal 82 can easily be inserted into the groove 110b as it is guided by the projection 110c. Furthermore, the projection 110c has its surface that is adjacent the circuit substrate 102 formed in a tapered shape and thus its thickness reduced toward the tip end side, and therefore the battery side positive electrode terminal 82 in a C-shape can readily be inserted into the groove 110b while it is pushed and expanded by the projection 110c.

In addition, according to the embodiment, the spacer 100 provided between the flat battery 2 and the circuit substrate 102 is provided with the projections 111 on its surface that is adjacent the circuit substrate 102. The circuit substrate 102 is provided with the holes 102b into which the projections 111 can be inserted. In this way, the circuit substrate 102 can be positioned with respect to the spacer 110 by inserting the projections 111 of the spacer 110 to the holes 102b when the circuit substrate 102 is provided to the spacer 110. Therefore, the operation efficiency in assembling of the battery unit 100 can be improved.

Furthermore, two such projections 111 are provided at an interval of 180° at the spacer 110 in the circumferential direction. More specifically, the two projections 111 are positioned on the opposite sides with the central part of the spacer 110 therebetween in a plan view. The circuit substrate 102 is provided with two holes 102b corresponding to the projections 111. In this way, the circuit substrate 102 can surely be positioned to the spacer 110.

Other Embodiments

While the embodiments of the present invention have been described above, the same is by way of illustration and example only and is not to be taken by way of limitation. The embodiments can therefore be carried out in various modified forms without departing the spirit and scope of the present invention.

According to the above-described embodiments, the battery side negative electrode terminal 81, 91, or 121 and the battery side positive electrode terminal 82 are connected to the circuit substrates 61 or 102. More specifically, the substrate side terminals 63 provided in the notches 61$a$, 102$a$, or 102$c$ of the circuit substrate 61 or 102 and the battery side negative electrode terminals 81, 91, or 121 and the battery side positive electrode terminals 82 are connected respectively by soldering. However, the arrangement of the terminals of the flat battery 2 may be in any form as far as the positive electrode can 10 and the negative electrode can 20 of the flat battery 2 and the circuit substrate 61 can be electrically connected.

According to the above-described embodiments, the notches 61$a$, 102$a$, and 102$c$ of the circuit substrates 61 and 102 have a substantially semicircular shape but the shape of the notches may form a part of a circle or a full circle or may be any other shape such as a rectangular shape instead of a circle.

According to the first embodiment, the terminals 66 to 69 of the battery unit 1 are rectangular. According to the second embodiment, the terminals 103 to 106 of the battery unit 100 each have a sector shape. However, the terminals may have any other shape such as a concentric circle. Note that if the terminals are formed in a concentric circle shape, it may be unnecessary to position the battery unit 1 with respect to an electrical device.

According to the above-described embodiments, the circuit substrates 61 and 102 each have a shape and a size equal to the outer shape of the flat battery 2 but the circuit substrates 61 and 102 may be smaller or larger than the flat battery 2.

According to the above-described embodiments, the layered body including the circuit portion 3 or 101 and the flat battery 2 has its side surface covered with the tube 4 but the side surface does not have to be covered with the tube 4. In the latter case, the battery unit can be reduced in size for the absence of the tube 4. The side surface of the layered body may be coated with a resin material instead of the tube 4.

According to the above-described embodiments, a prescribed distance is provided between the circuit components 62 of the circuit portion 3 or 101 and the flat battery 2 but the distance does not have to be provided. The circuit portion 3 or 101 may be provided at the positive electrode can 10 as an exterior can rather than at the negative electrode can 20 as a sealing can. Furthermore, the circuit components 62 of the circuit portion 3 or 10 may be mounted on a surface of the circuit substrate 61 or 102 on the opposite side to the flat battery 2.

According to the first embodiment, the flat battery 2 and the circuit portion 3 are adhesively fixed by an elastic adhesive but any other adhesive material such as tape may be used to fix them or the flat battery 2 and the circuit portion 3 may be connected by terminals in a fixed manner.

According to the above-described embodiments, the spacer 71 or 110 is used to provide a distance between the circuit substrate 61 or 102 and the flat battery 2. However, instead of providing the spacers 71 or 110, an adhesive may be used to form the distance. In the latter case, at least one of the circuit portions 3 and 101 or the flat battery 2 may be held so that a distance forms between them when a battery unit is formed.

According to the above-described embodiments, the positive electrode can 10 is used as an exterior can and the negative electrode can 20 is used as a sealing can but a negative electrode can may be used as an exterior can and a positive electrode can may be used as a sealing can. In the latter case, the battery side negative electrode terminal 81 or 121 may be used as a battery side positive electrode terminal and the battery side positive electrode terminal 82 may be used as a battery side negative electrode terminal.

According to the above-described embodiments, the flat battery 2 is formed as a lithium ion battery. However, the flat battery 2 may be any other battery as far as it is a secondary battery that can be charged/discharged. The flat battery 2 may be a primary battery. If the flat battery 2 is a primary battery, a capacitor or the like is mounted as a circuit portion.

According to the above-described embodiments, the battery side negative electrode terminal 81, 91, or 121 and the battery side positive electrode terminal 82 are partly provided between the spacer 71 or 110 and the circuit substrate 61 or 102, so that the substrate side terminals 63 provided in the notches 61$a$, 102$a$, or 102$c$ of the circuit substrate 61 or 102 and the battery side negative electrode terminal 81, 91 or 121 and the battery side positive electrode terminal 82 are connected by soldering. However, without providing either one of the battery side negative electrode terminals 81, 91, and 121 or the battery side positive electrode terminal 82 between the spacers 71 or 110 and the circuit substrates 61 or 102, the flat battery 2 and the circuit substrates 61 or 102 may be adapted to be electrically connectable. The connection arrangement between the battery side negative electrode terminal 81, 91, or 121 and the battery side negative electrode terminal 82 and the circuit substrates 61 or 102 may be any other arrangement. If grooves are formed in the spacer 110 as in the second embodiment, the grooves may be provided in the spacer 110 based on how terminals positioned between the circuit substrate 102 and the spacer 110 are arranged.

According to the second embodiment, both ends of the battery side negative electrode terminal 121 are obliquely arranged so that the outer circumferential edges of the circuit substrate 102 in the notch 102$a$ are connected. However, the ends may be formed in any other shape such as a circular arc shape that forms a part of the outer shape of the disk-shaped circuit substrate 102.

According to the second embodiment, the projection 110$c$ is provided in the spacer 110 so that the battery side positive electrode terminal 82 is contacted to the projection 110$c$. However, the projection 110$c$ does not have to be provided in the spacer 110. In the latter case, the battery side positive electrode terminal 82 may be provided to project outwardly in the radial direction of the flat battery 2. Furthermore, instead of providing the battery side positive electrode terminal 82 apart from the side surface of the flat battery 2, the battery side positive electrode terminal 82 may have an increased thickness to project outwardly in the radial direction of the flat battery 2.

According to the second embodiment, the grooves 110$a$ and 110$b$ are formed in the spacer 110, and the battery side negative electrode terminal 121 and the battery side positive electrode terminal 82 are provided in the grooves 110$a$ and 110$b$, respectively. However, the spacer 110 does not have to be provided with the grooves.

According to the second embodiment, the grooves 110$a$ and 110$b$ formed in the spacer 110 have a depth greater than the substrate connection portion 121$b$ of the battery side negative electrode terminal 121 and the substrate connection portion 82$b$ of the battery side positive electrode terminal 82, respectively. However, the grooves 110$a$ and 110$b$ may have a depth smaller than the substrate connection portions 121$b$ and 82$b$. In the latter case, a gap forms between the spacer 110 and the circuit substrate 102 and therefore the projection 111 must have a length increased for the gap.

According to the second embodiment, among the notches 102a and 102c provided in the circuit substrate 102, the notch 102c in which the battery side positive electrode terminal 82 is positioned is provided more outwardly in the radial direction of the circuit substrate 102 than the other notches 102a. However, the notches 102a and 102b may be provided in the same position in the radial direction of the circuit substrate 102.

According to the second embodiment, the two projections 111 are formed at an interval of 180° in the circumferential direction on the spacer 110. However, the two projections 111 may be provided in any positions on the spacer 110.

According to the second embodiment, the projections 111 are formed at the spacer 110. However, the projections may be provided at the circuit substrate 102. Alternatively, a part of a plurality of projections may be provided at the spacer 110 and the rest may be provided at the circuit substrate 102.

INDUSTRIAL APPLICABILITY

A battery unit according to the invention is applicable to a structure including a substrate having a circuit formed thereon and a substantially circular shaped flat battery mounted to a small device.

The invention claimed is:

1. A battery unit, having a circular cylinder shape, comprising:
   a flat battery having a circular shape, and having a tubular exterior can with a first flat circular bottom, a first side cylindrical wall and an opening, and a tubular sealing can with a second flat circular bottom and a second side cylindrical wall, the sealing can covering the opening of the exterior can, the exterior can and the sealing can being assembled so that a portion of the first side cylindrical wall of the exterior can that is adjacent to the opening is positioned on an outer circumference of the second cylindrical side wall of the sealing can; and
   a substrate provided on the first flat circular bottom of said exterior can or the second flat circular bottom of said sealing can,
   said substrate being mounted with a circuit component,
   of the flat circular bottoms of the exterior can and the sealing can, the flat circular bottom which is provided with said substrate thereon being provided with a battery terminal electrically connected to the flat battery,
   said substrate having a substrate terminal electrically connected to said battery terminal at a side surface thereof.

2. The battery unit according to claim 1, wherein said circuit component is mounted at a surface of said substrate closer to the flat battery.

3. The battery unit according to claim 1, wherein said substrate is provided with a notch at an outer circumferential edge thereof, and
   said substrate terminal is formed on a side surface of said substrate in said notch.

4. The battery unit according to claim 3, wherein said notch is formed to have a shape that forms at least a part of a circle when viewed in a thickness-wise direction of said substrate.

5. The battery unit according to claim 3, wherein said battery terminal is connected to a surface of said substrate closer to the flat battery.

6. The battery unit according to claim 5, wherein said substrate is provided so that said notch is positioned on said battery terminal, and
   a tip end of said battery terminal projects inwardly in the notch so as to connect outer circumferential edges of said substrate in the notch when viewed in the thickness-wise direction of said substrate.

7. The battery unit according to claim 1, wherein in a view seen above the second flat circular bottom of the tubular sealing can, said substrate has a shape and a size equal to those of an outer shape of the flat battery while the substrate is provided on said flat battery.

8. The battery unit according to claim 1, wherein a plurality of said battery terminals are provided on one of the first flat circular bottom and the second flat circular bottom which is provided with said substrate thereon, and
   at least one of said plurality of battery side terminals is electrically connected to said substrate in at least two points.

9. The battery unit according to claim 8, wherein said battery terminal electrically connected to said substrate in at least two points has a battery connection portion connected to said flat battery and at least two substrate connection portions electrically connected to said substrate,
   said substrate connection portions are provided to have said battery connection portion placed therebetween, and
   said battery connection portion projects toward said flat battery and is located closer to said flat battery than said substrate connection portions are, so that a space in which said circuit component can be provided is formed between said battery connection portion and said substrate.

10. The battery unit according to claim 1, wherein an insulating gasket is provided between said exterior can and said sealing can, and said exterior can is bent inwardly and caulked to the sealing can.

11. The battery unit according to claim 1, wherein a spacer is provided between the substrate and the flat battery.

* * * * *